(12) United States Patent
Hirsh et al.

(10) Patent No.: US 6,560,079 B1
(45) Date of Patent: May 6, 2003

(54) GROUND LOSS DETECTION FOR ELECTRICAL APPLIANCES

(75) Inventors: Stanley S. Hirsh, El Paso, TX (US); David C. Nemir, El Paso, TX (US)

(73) Assignee: X-L Synergy, El Paso, TX (US)

( * ) Notice: Subject to any disclaimer, the term of this patent is extended or adjusted under 35 U.S.C. 154(b) by 0 days.

(21) Appl. No.: 09/394,982

(22) Filed: Sep. 13, 1999

Related U.S. Application Data (63) Continuation-in-part of application No. 08/799,919, filed on Feb. 13, 1997, now Pat. No. 5,943,198, which is a continuation-in-part of application No. 08/756,784, filed on Nov. 26, 1996, now Pat. No. 5,973,896, which is a continuation-in-part of application No. 08/653,943, filed on May 22, 1996, now Pat. No. 5,844,759, which is a continuation of application No. 08/453,664, filed on May 26, 1995, now abandoned.

(60) Provisional application No. 60/100,577, filed on Sep. 16, 1998.

(51) Int. Cl.⁷ .................................................. H02H 3/00
(52) U.S. Cl. .......................... 361/42; 361/49; 340/649; 340/652
(58) Field of Search ...................... 361/42–50; 340/635, 340/649, 650, 652; 324/509, 510

(56) References Cited

U.S. PATENT DOCUMENTS

| | | | |
|---|---|---|---|
| 3,697,808 A | 10/1972 | Lee ........................... | 317/18 A |
| 3,809,961 A | 5/1974 | Kershaw .................... | 317/18 B |
| 3,996,496 A | 12/1976 | Volk ........................... | 317/18 B |
| 4,068,276 A | * 1/1978 | Pintell ......................... | 361/46 |
| 4,598,331 A | 7/1986 | Legatti ......................... | 361/46 |
| 4,649,454 A | 3/1987 | Winterton et al. ............. | 361/50 |
| 4,931,893 A | 6/1990 | Glennon et al. ............... | 361/45 |
| 5,844,759 A | 12/1998 | Hirsh et al. .................... | 361/42 |
| 5,943,198 A | 8/1999 | Hirsh et al. .................... | 361/42 |
| 5,973,896 A | 10/1999 | Hirsh et al. .................... | 361/54 |

FOREIGN PATENT DOCUMENTS

EP    0 154 450    * 9/1985     H02H/3/33

* cited by examiner

*Primary Examiner*—Ronald W. Leja
(74) *Attorney, Agent, or Firm*—Jeffrey D. Myers; Peacock, Myers & Adams, P.C.

(57) ABSTRACT

A low cost, low parts count electronic circuit that is built into an appliance automatically and continuously checks for an open ground condition or a condition where the power conductors are transposed, at which time, power is interrupted in the appliance. By combining this with an electrical leakage detection circuit and power interrupter at the plug, the electrical safety of the appliance is greatly enhanced.

8 Claims, 10 Drawing Sheets

GROUND LOSS DETECTION FOR ELECTRICAL APPLIANCES

CROSS REFERENCE TO RELATED APPLICATIONS

This application claims the benefit of the filing of US. Provisional Patent Application Ser. No. 60/100,577 entitled "Ground Loss Detection for Electrical Appliances", filed on Sept. 16, 1998, and the specification thereof is incorporated herein by reference.

This application is a continuation in part application of U.S. patent application Ser. No. 08/756,784, entitled "Shock and Arc Protection Device for an Electrical Distribution System", to Hirsh et al, filed on. Nov. 26, 1996 now U.S. Pat. No. 5,973,896, which is a continuation in part application of Ser. No. 08/653,943 now U.S. Pat. No. 5,844,759, entitled "Electrical Fault Interrupter" to Hirsh et al, that was filed on May 22, 1996 and issued on Dec. 1, 1998, and also 08/799, 919 now of U.S. Pat. No. 5,943,198 entitled "Electrical Fault Interrupt Circuits" to Hirsh et al, that issued on Aug. 24, 1999 and was filed on Feb. 13, 1997 as a continuation of Ser. No. 08/453,664 filed on May 26, 1995 now abandoned, the teachings of all of which are incorporated herein by reference.

BACKGROUND OF THE INVENTION

1. Field of the Invention

This invention relates to a low cost, compact electronic circuit that is built into an appliance and detects the presence or absence of a ground connection or the occurrence of transposed grounded and ungrounded power conductors, and causes power to be removed from the appliance if one of these unsafe operating conditions exists.

2. Background of the Invention

An electrical appliance or load receives electrical energy from one terminal of an electrical outlet or source (the so-called high voltage or hot side), electrical current flows to the load through an electrical conductor (a wire), this current passes through the load and is then returned to another terminal of the electrical outlet through another wire called the neutral wire. The two wires that connect source and load may have a coating of rubber or some other electrical insulating material or they may be bare, in which case air, which is a good insulator, functions to inhibit electrical current flow outside of the wire. Since the human body can conduct the flow of electrical current, if a person comes into contact with one electrified object such as the so-called hot wire in an electrical system, while also making contact with a second object having a substantially different voltage, then an electrical leakage current that is proportional to the voltage difference will flow through the person and may cause injury or death. If the second object that the person comes in contact with is electrically connected to the earth ("ground") then this is called a ground fault.

Electrical current is the flow of electrons. Electrons are neither created nor destroyed so any functioning electrical appliance will require both an entry path for electrons and an exit path for electrons in order for electrical current to flow. For most household appliances that operate from a plug, electrons will sometimes enter path one and exit path two and sometimes enter path two and exit path one. This is known as alternating current or AC operation.

Although the two conductors coming out of an AC power source are often designated as "hot" and "neutral", in an AC system, the hot conductor will cyclically have a more positive voltage than the neutral for half the time and will cyclically have a more negative voltage than neutral for half the time, having a momentary value of zero (the so-called "zero crossing") each time the voltage passes from positive to negative or from negative to positive.

Any electrical appliance that plugs into a wall outlet can be the source of electrical shock, electrical burns, and possibly electrocution. Worn or damaged appliances or appliance cords may come in contact with a conducting surface that is accessible to the user, thus presenting a hazardous condition. For example, if the rubber insulation on a wire within an appliance is worn then the exposed metal wire strands might touch the appliance housing. If the appliance housing were made out of metal or a similar electrical conducting material then a shock hazard would exist.

In order to minimize the potential hazards intrinsic to electrical appliances, government and industry standards serve to regulate the way in which appliances are built and used. One outcome is that many classes of electrical appliances are required to have a grounded connection over and above the standard two electrically conductive wires that supply electrical power to the appliance. A grounded electrical cord is recognizable because it has a plug with three prongs. In the U.S., in a 115 volt single phase system, two of the prongs on a grounded plug are flat and the third, ground prong, is generally rounded.

To achieve electrical protection, the grounding line will connect to ground at the plug where it is plugged into a grounded outlet. The other end of the grounding line, within the cordset, will connect to the appliance housing or other exposed or potentially exposable metal parts. If an electrically hot (that is, having a voltage potential that is significantly different from a ground potential) conductor comes into contact with a grounded conductor, the grounded conductor will present a low resistance path to ground, causing the hot conductor to maintain a voltage at or near a ground potential. If the current drawn from an electrically hot source, through ground, exceeds the "trip" current of an in-line circuit breaker, the circuit breaker will open, removing power from the outlet that the appliance is plugged into, thereby protecting the electrical distribution system from overcurrent damage and protecting the user from electrical shocks.

If the ground connection on a grounded appliance is removed, the safety of the appliance is compromised. This removal of ground condition can occur through abuse or damage but more commonly occurs when the appliance is plugged into an outlet in which the ground has not been, connected or is improperly wired. The removal of ground may also occur if the grounding prong is cut off of the plug or is otherwise disconnected. An open ground condition generally goes unnoticed by the casual user. This is because most appliances will operate normally without a ground connection.

In the U.S., agencies such as the National Fire Protection Association (NFPA) and the Occupational Safety and Health Association (OSHA) maintain regulations governing the use of grounded appliances. For many situations, these regulations require that a qualified technician periodically test the continuity of the ground connection between appliance and the grounding prong and between grounding prong and actual ground.

One drawback to the periodic test approach is that a significant period of time may elapse between inspections. In many situations the inspection schedule may not be adhered to or may be completely ignored. Also, malfunctions, particularly if intermittent, may go undetected. Often a complete inspection of the grounding impedance between appliance and actual ground is not made. Accordingly, there are many situations where a user may assume he is using a grounded appliance when he is not.

Another potentially hazardous operating condition occurs when the hot and the neutral conductors are switched at an outlet. The typical appliance that is plugged into an outlet with these so-called "transposed" conductors will still operate. However, the design of many appliances is such as to favor having one of the two power carrying conductors designated as the neutral conductor. For example, in a droplight, the socket for an incandescent light bulb will have the outer shell as neutral with the base connected to the hot conductor. Then if a user accidentally makes contact with the exposed outer shell, electrical shock is less likely to result. The neutral and hot conductors are distinguished by using a polarized plug wherein one of the two blades is designated as neutral and is physically wider. If a droplight is plugged into a polarized outlet but the hot and neutral conductors in that outlet are transposed, the safety associated with using a polarized plug has been compromised. In such situations, it is important to alert the user.

In the prior art, U.S. Pat. No. 3,697,808 (Lee) discloses a system for monitoring chassis potential and ground continuity by injecting a radio frequency (RF) signal into the neutral lead and monitoring the amount that is capacitively coupled to ground. A major limitation of this approach is that it is electronically complicated and is sensitive to leakages through capacitances in the power cable and elsewhere.

U.S. Pat. No. 3,809,961 (Kershaw) discloses an electrical outlet sentinel that detects an open ground condition in an electrical outlet and opens a mechanical circuit breaker thereby removing power from the outlet. A major objection to this design is that power from the outlet is controlled by a circuit breaker whose relay is energized through power running continuously through ground. For any practical relay, this represents a substantial continuous ground current and is likely to disrupt the correct operation of any ground fault circuit interrupters that are upstream in the electrical distribution system.

U.S. Pat. No. 3,996,496 (Volk) discloses a ground integrity monitor that relies on the application of short electrical pulses between the neutral and ground terminals. If the resistance between neutral and ground is less than a threshold amount, this pulsing purportedly causes a photo coupler to be activated, providing power to the load. The system is electronically complicated and this compromises the appeal of the design.

U.S. Pat. No. 4,598,331 (Legatti) discloses a ground fault interrupt circuit in which open ground conditions create actuation of the interrupter. An open ground produces current flow through a supplemental secondary winding that, in turn, induces a trip signal. When implemented, this approach does not check for a ground connection going forward to the appliance, but only going back to the outlet. If, for example, the grounding conductor on the appliance cordset is cut, thereby leaving the appliance ungrounded, this approach will not detect that condition.

U.S. Pat. No. 4,649,454 (Winterton et al) discloses an open ground detection circuit for appliances that utilizes a special plug with four electrical connections. Two of these are the standard hot and neutral prongs. A third prong, having the location and shape of a conventional ground prong, has two electrical conductors (the so-called grounding blade and sensing blade) that are separated by an insulating member. Four wires connect this special plug to a housing that is located within an appliance. When the special plug is correctly seated in a three hole grounded outlet, the two blades on the third prong are electrically connected together. If, however, the two conductors on the third prong are not electrically connected together then an alarm signals that an open ground condition exists. A major problem with this design is that it only checks to see whether grounding blade and sensing blade are shorted together. This can occur even if the plug is connected to an ungrounded outlet and the user would incorrectly assume that the appliance was grounded. Another problem with this design is that it requires a special plug and four wires to connect between the appliance and this special plug.

U.S. Pat. No. 4,931,893 (Glennon) discloses a circuit that detects a loss of ground condition in an electrical system by using a capacitive circuit that discharges through the ground. The disclosed embodiments are electronically complex and can generate relatively high ground currents which would cause nuisance tripping in distribution systems having ground fault interrupters.

U.S. Pat. No. 5,844,759 and 5,943,198 and U.S. patent application Ser. No. 08/756,784, all to Hirsh et al, describe a solid state ground and arc fault detection and interruption technology that has two parts, one part which resides in the load and one part which resides in the source. In applying this to an electrical appliance, the load is the appliance and the source is the plug. The basic theory in this technology is that a load conditioning module in the appliance injects a deadzone in the current flow during each half wave AC cycle.

A sensing circuit in the plug looks for the presence of that deadzone each half cycle. If there is leakage around the load conditioning module (indicating a ground fault or arcing fault) this is indicative of a potential dangerous condition and current flow is interrupted at the plug.

3. Objects and Advantages

Prior art approaches to open ground detection in appliances required more than the standard three conductors connecting plug to load, were relay based, were slow to respond, were complicated to implement, and did not self-reset upon restoration of a ground connection. Many of these embodiments include an alarm or indicator to flag the open ground condition, but have no means to interrupt the electrical current at the plug and thereby protect the appliance user.

In contrast, the present invention has the following objects and advantages:

a) It detects and indicates the occurrence of an open ground condition in an appliance load;

b) It detects and indicates the transposition of the ungrounded (hot) and grounded (neutral) conductors at the appliance load;

c) It does not require a mechanical circuit breaker;

d) It does not require a differential current sense transformer, e) It can detect open ground or transposed conductor conditions when power is first applied to the load or, subsequently, within one half cycle of the occurrence of these conditions;

f) When used with specialized fault detection circuitry located at the plug, it can provide electrical shock protection;

g) It does not require additional wiring over the standard three conductors connecting plug to appliance;

h) It is self-resetting and thereby not subject to nuisance tripping problems;

i) It is simple in design and compact in construction; and j) It is automatic and forces the appliance user to correct a potentially dangerous operating condition before the appliance is allowed to operate.

Further objects and advantages of the present invention will become apparent from a consideration of the drawings and ensuing description.

SUMMARY OF THE INVENTION

This invention consists of a method and apparatus for continuously monitoring the ground connection in an electrical appliance. A ground detection electrical circuit (part A) that is inserted in series with the appliance load continuously monitors ground and interrupts appliance power if ground is lost or if the hot and neutral conductors coming into the appliance are transposed. When a correct interconnection is restored, the electrical circuit allows current to flow into the appliance.

Using the ground detection electrical circuit, electrical shock protection can optionally be afforded by adding a specialized electronic fault detection/interruption circuit at the plug (part B). This fault detection/interruption circuit operates by looking for a characteristic signature of the part A component at the load. If part A is not correctly connected (eg: ground is open or the hot and neutral legs are transposed) or if there is an electrical path that bypasses part A, this will be detected at part B and electrical current flow at the plug will be interrupted. When part A becomes correctly connected and when all electrical paths that bypass part A are removed, then power to the appliance will be restored.

The invention may be used to implement a low voltage/low current switch. This switch can then be used to turn on and off power to the appliance, the improvement being that a relatively low cost switch can be used to do the job that formerly required a higher cost switch.

None of the prior art embodiments, either alone or in combination, anticipates the present invention.

LIST OF REFERENCE NUMERALS

20—Plug
21—Ground prong on plug
22—Electrical outlet
23—Neutral prong on plug
24—Hot conductor
25—Hot prong on plug
26—Neutral conductor
28—Ground conductor
29—Earth ground
30—Load
32—Appliance housing
34—Control circuit
36—Triac
37—Sensitive gate triac
38—Triac gate
39—SCR gate
40—Resistor
41—Desensitizing resistor
42—MT1 terminal of triac
43—Cathode of SCR
44—MT2 terminal of triac
45—Anode of SCR
46—Low current switch
47—Silicon controlled rectifier
48—Limiting resistor
49—NPN transistor
50—Neon indicator lamp
51—PNP transistor
52—Low current/low voltage switch
53—Steering diode
54—Back to back zener diodes
55—Steering diode
56—Current dead zone
57—Ground current limiting resistor
58—Diac
60—Hot prong
62—Neutral prong
64—Ground prong
66—Hot side triac
68—Diac
70—Charge capacitor
72—Steering diodes
74—NPN Darlington
76—PNP Darlington
78—Resistor
80—Voltage divider
82—Conductor
84—Conductor
86—Hot to ground fault
88—Hot to neutral fault
90—Load to ground fault
92—Node

DESCRIPTION OF THE PREFERRED EMBODIMENTS

Figure 1:
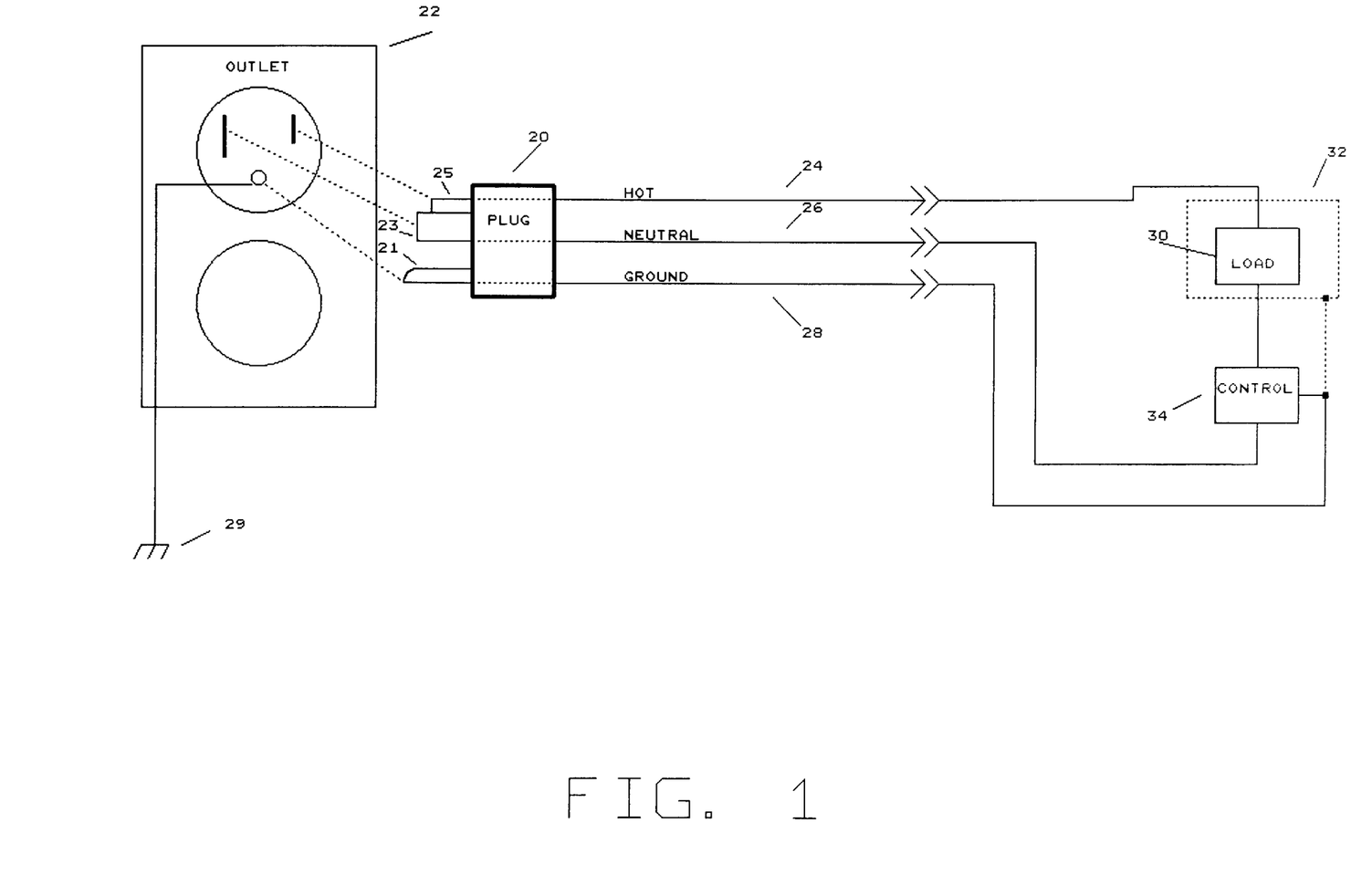
FIG. 1 Block diagram of ground detection circuitry

FIG. 1 portrays a block diagram of the ground detection circuitry. A plug 20 has three prongs 21,23,25 on one side that insert into an electrical outlet 22. By convention, these prongs are configured to correspond to either the ungrounded conductor 24 (also known as the "hot" conductor), the grounded conductor 26 (also known as the "neutral" conductor) or the ground conductor 28, which, when plug 20 is inserted into outlet 22, should be electrically connected to earth ground 29. This connection to earth ground 29 may be at the outlet 22 or at a remotely located distribution panel, transformer, or other location. The load 30 represents an appliance load, for example, the heater coil in an electric heater, the light bulb filament in an electric light, or the motor in a pump. The load 30 may be optionally surrounded by a grounded appliance housing 32. A control circuit 34 is connected in electrical series between the load 30 and the neutral conductor 26. The control circuit 34 also makes a connection to the ground conductor 28. The control circuit 34 serves to monitor the connection to ground through the ground conductor 28. When this connection is broken, the control circuit responds by inhibiting the flow of electrical current out of the load 30 and to the neutral conductor 26 thereby forcing the appliance into an off condition.

Figure 2:
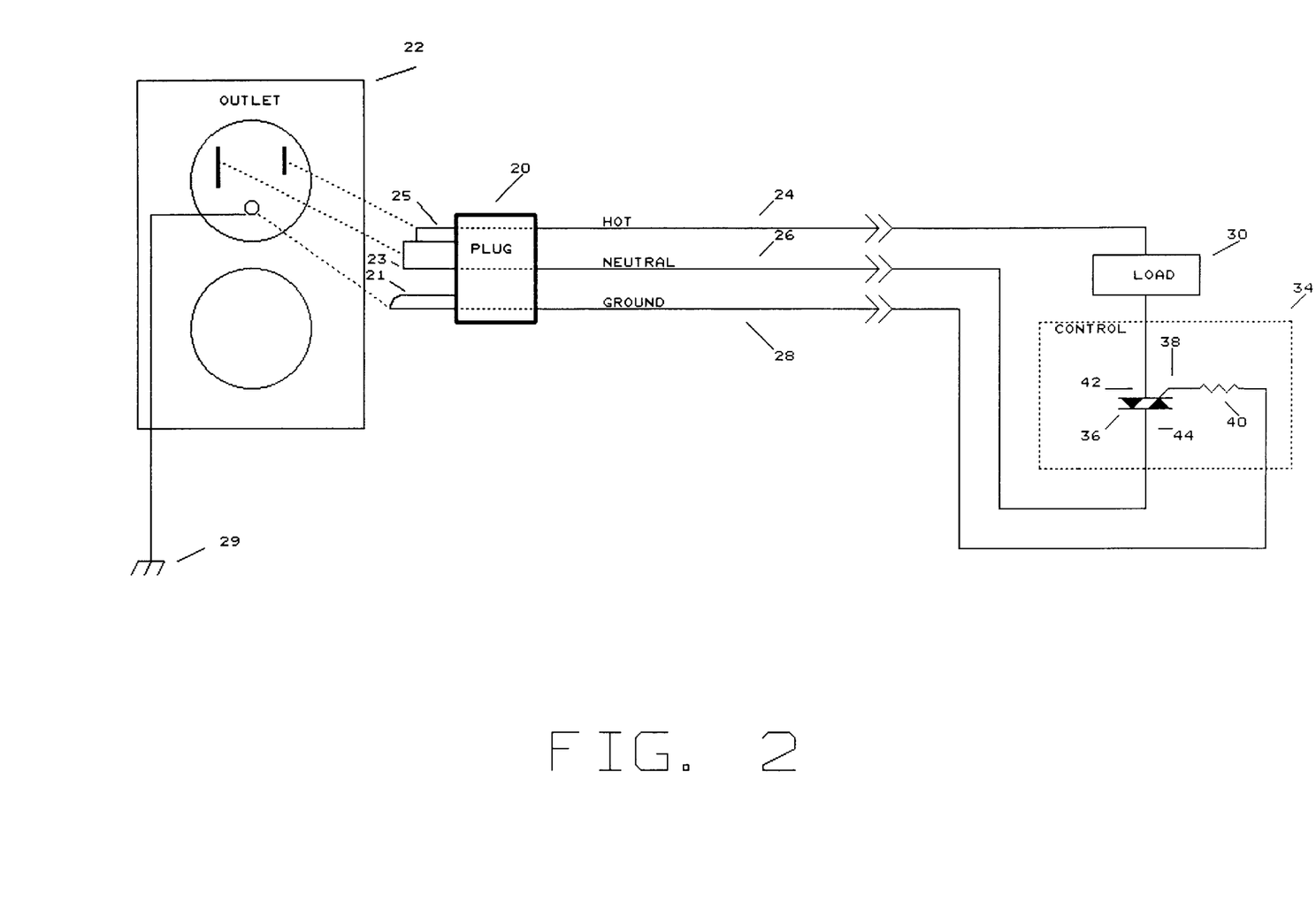
FIG. 2 Specific embodiment of ground detect circuit

FIG. 2 depicts a specific embodiment of the ground detect circuit. In its simplest embodiment, the control 34 consists of a triac 36 electrically connected at the MT1 terminal 42 to the load 30 and from the MT2 terminal 44 to the neutral conductor 26. A triac is a type of thyristor which may be thought of as a latching electrical switch. When the magnitude of the voltage potential at the triac gate 38 exceeds the magnitude of the voltage potential at the MT1 terminal 42 by more than some characteristic gate turn-on voltage, the triac 36 turns on, allowing electrical current to flow from the load 30 to the neutral conductor 26. Once the triac 36 is triggered into a conducting state, it continues to conduct electrical current as long as current magnitude is above some minimum threshhold known as the holding current. In this case, the triac 36 is said to be latched and continues to conduct even in the absence of a gate stimulus. If the triac 36 is in a nonconducting state, and the voltage potential at the triac gate 38 remains below the gate turn-on voltage, then the triac 36 will remain in a nonconducting state and little or no electrical current will flow from the load 30 into the neutral conductor 26. A resistor 40 may be used to connect between the ground conductor 28 and the triac gate 38. This serves to limit current flow to ground to that amount sufficient to turn on the triac 36 without drawing excessive currents that might damage the triac 36 or exceed accepted standards for ground current.

In a properly wired electrical distribution system, the neutral conductor 26 will have a voltage potential very close to that of the earth ground potential. Accordingly, as the voltage potential of the hot conductor 24 cyclically rises above that of the neutral conductor 26 and then falls below that of the neutral conductor 26, the triac 36 is turned on to allow current flow in first one direction and then the other. The load 30 then receives essentially full power for each half cycle of alternating current excitation and the appliance operates normally.

If the electrical connection from the triac gate 38 to the earth ground 29 through resistor 40 and through ground conductor 28 is nonexistent or becomes broken, this corresponds to a loss-of-ground condition. A loss-of-ground condition can occur because the appliance is plugged into an ungrounded electrical outlet 22, or because the ground conductor 28 is broken or missing, or because the grounding prong on the plug 20 has been cut off or does not seat correctly in the electrical outlet 22. Under a loss-of-ground condition, the triac gate 38 will maintain a voltage potential very close to that of the potential of the MT1 terminal 42, and the triac 36 will remain in a nonconducting state. For an AC excitation, upon the occurrence of a loss-of-ground condition, the triac 36 will allow electrical current to flow for the balance of the AC half cycle. Upon the first subsequent zero crossing of the AC excitation, as the current drops to zero, the triac 36 will turn off and stay off until a subsequent time when the ground connection is restored. Accordingly, the maximum amount of time that will elapse between the occurrence of a loss-of-ground connection and the removal of electrical current from the load is one half cycle. For a 60 Hz electrical system this corresponds to 8.33 milliseconds. The user of the appliance will note the loss-of-ground condition because the appliance will not function.

The circuit in FIG. 2 does more than just detect a loss-of-ground condition and interrupt current upon the detection of that event. It also serves to detect the occurrence of transposed hot and neutral conductors. In FIG. 2, if the hot and neutral conductors are transposed, then the conductor 24 that is supposed to be the ungrounded conductor becomes grounded. In this situation, the triac MT1 terminal 42 will have the same potential as the triac gate terminal 38. The triac 36 will therefore not conduct and the load 30 will not be powered. All of the following discussions regarding the detection of a loss-of-ground condition can apply equally well to the detection of transposed power conductors. Because gate resistance 40 limits the electrical current that can be drawn through the triac gate 38, the load 30 does not receive significant power if there is an open neutral connection. Accordingly, the load 30 will not operate in the case of an open neutral.

Although FIG. 2 utilizes a triac 36 to implement ground loss sensing, it would be apparent to one skilled in the art that another type of thyristor such as a silicon controlled rectifier (SCR) might be used or that another type of electronic switch such as a transistor might be used.

FIG. 2 portrays the simplest configuration that yields ground loss detection. With only two, readily available components (triac 36 and resistor 40), appliances which require proper grounding can benefit from this enhanced safety at a minimal cost to the end user.

Figure 3:
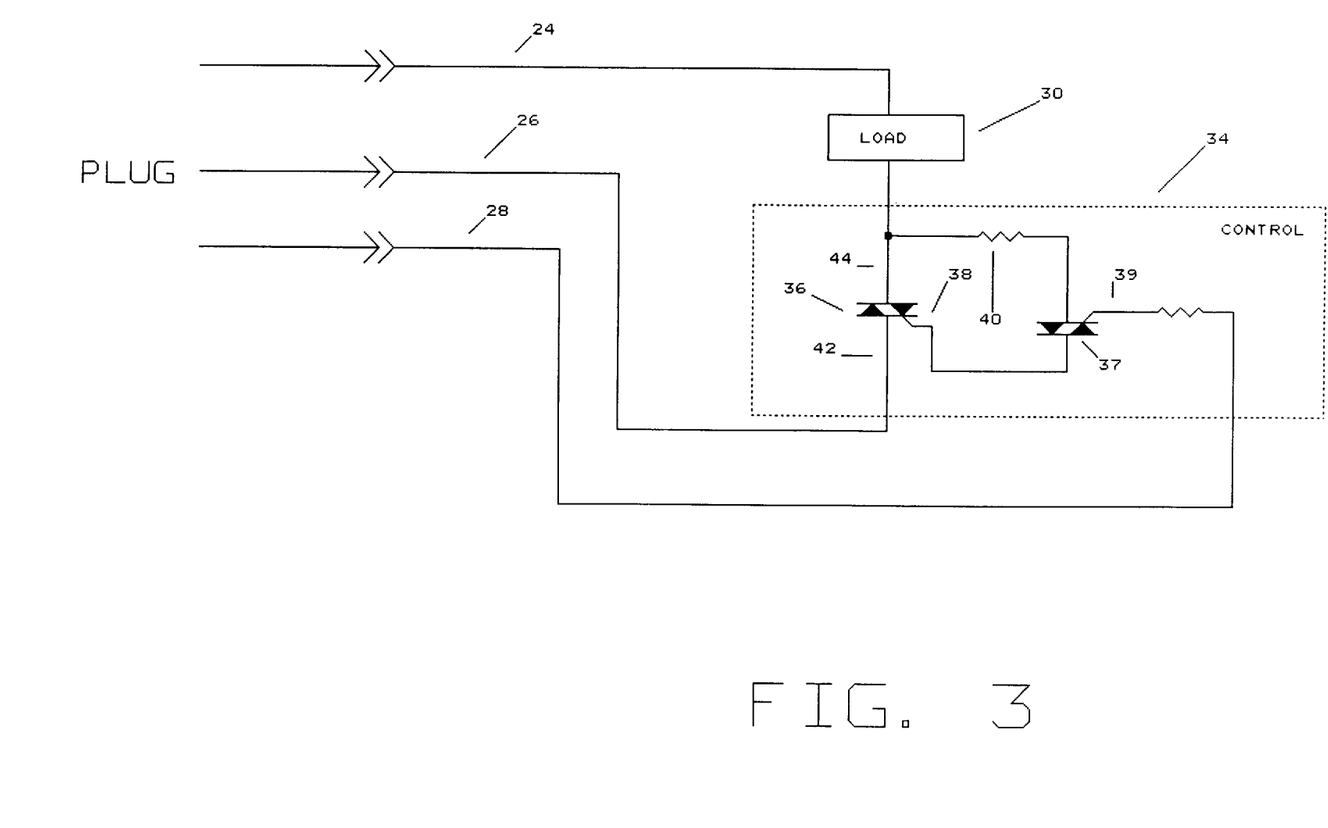
FIG. 3 Ground detect circuit using sensitive gate triac

FIG. 3 shows a ground detect circuit utilizing a sensitive gate triac boost. In this embodiment, an auxiliary sensitive gate triac 37 is added to the circuit in order to obtain minimal current draw from the ground conductor 28. When a ground conductor 28 is grounded, a very low level current at the gate 39 of the sensitive gate triac 37 will result in a higher level of gate current at the gate 38 of the triac 36. In this embodiment, the gate current at the triac gate 38 will not be sourced through the ground conductor 28 but will be sourced from the hot conductor 24 through the load 30, resistor 40 and sensitive gate triac 37. As in the discussion pertaining to FIG. 2, this circuit will respond in the same way to transposed conductors as it does to a loss-of-ground condition. In FIG. 3, the sensitive gate triac 37 serves as an amplifier. In a similar way, any electronic amplifier might be used to allow the control of the triac 36 by the momentary application of a Very low level ground current.

Figure 4:
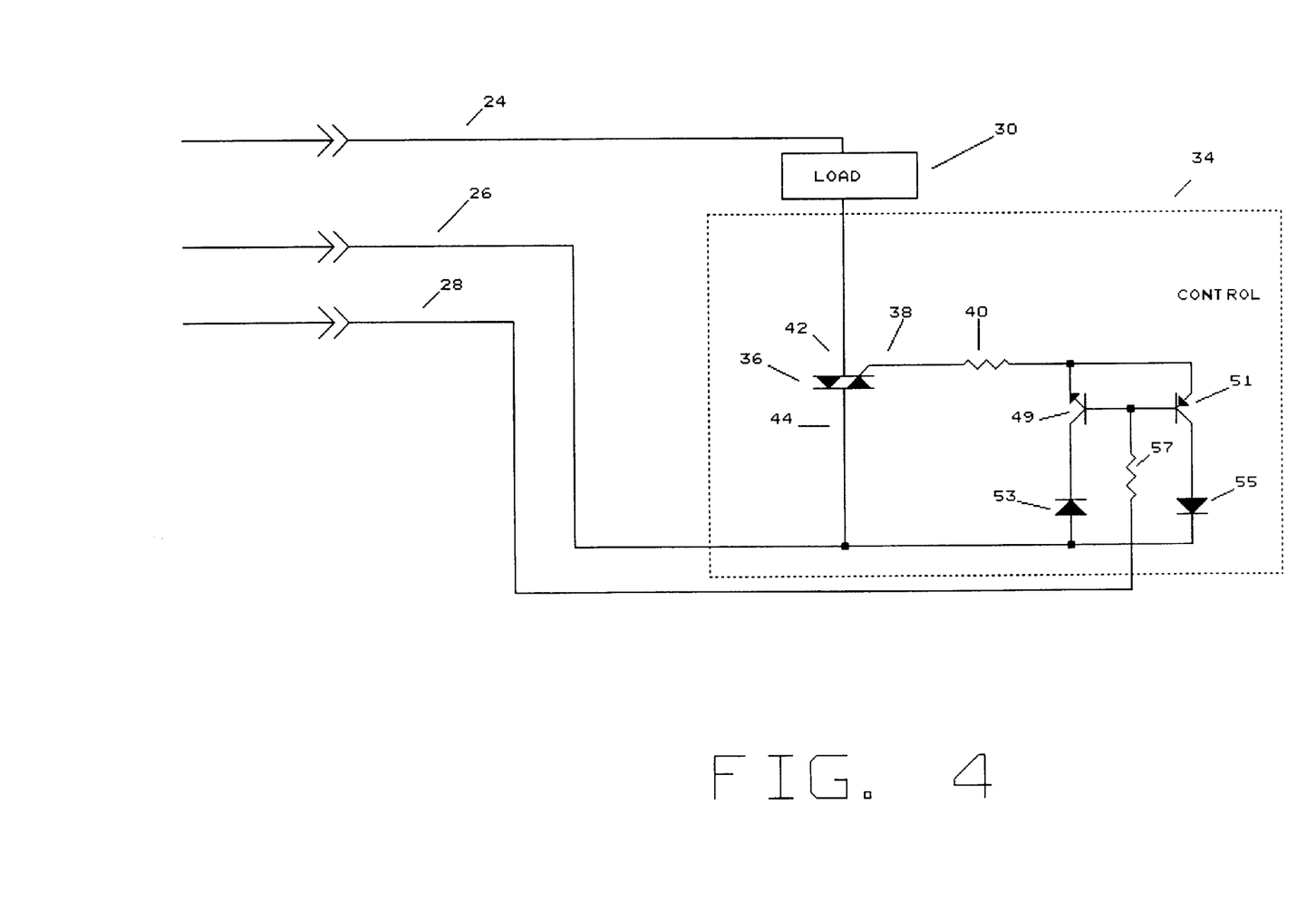
FIG. 4 Ground detect circuit with low current on/off switch

FIG. 4 shows a ground loss detection circuit that uses a transistor based amplifier to control the triac 36 based upon the state of the ground connection. When a ground connection is valid, a low level electrical current is drawn through ground current limiting resistor 57 to turn on one of the transistors 49 or 51. During negative half cycles of the applied AC source, the NPN transistor 49 is turned on if a ground connection is present, in turn triggering the triac 36. During positive half cycles of the applied AC source, the PNP transistor 51 is turned on if a ground connection is present, causing triac 36 to fire. Steering diodes 53 and 55 serve to block current flow in a reverse direction on whichever is the inactive transistor during each half cycle. At the beginning of each half cycle, once the triac 36 is turned on, the voltage at the triac gate 38 becomes very small in magnitude relative to the MT2 terminal 44. This causes the active transistor, either 49 or 51 to turn off, the result being that extremely low levels of electrical current are drawn through ground using this approach.

Figure 5:
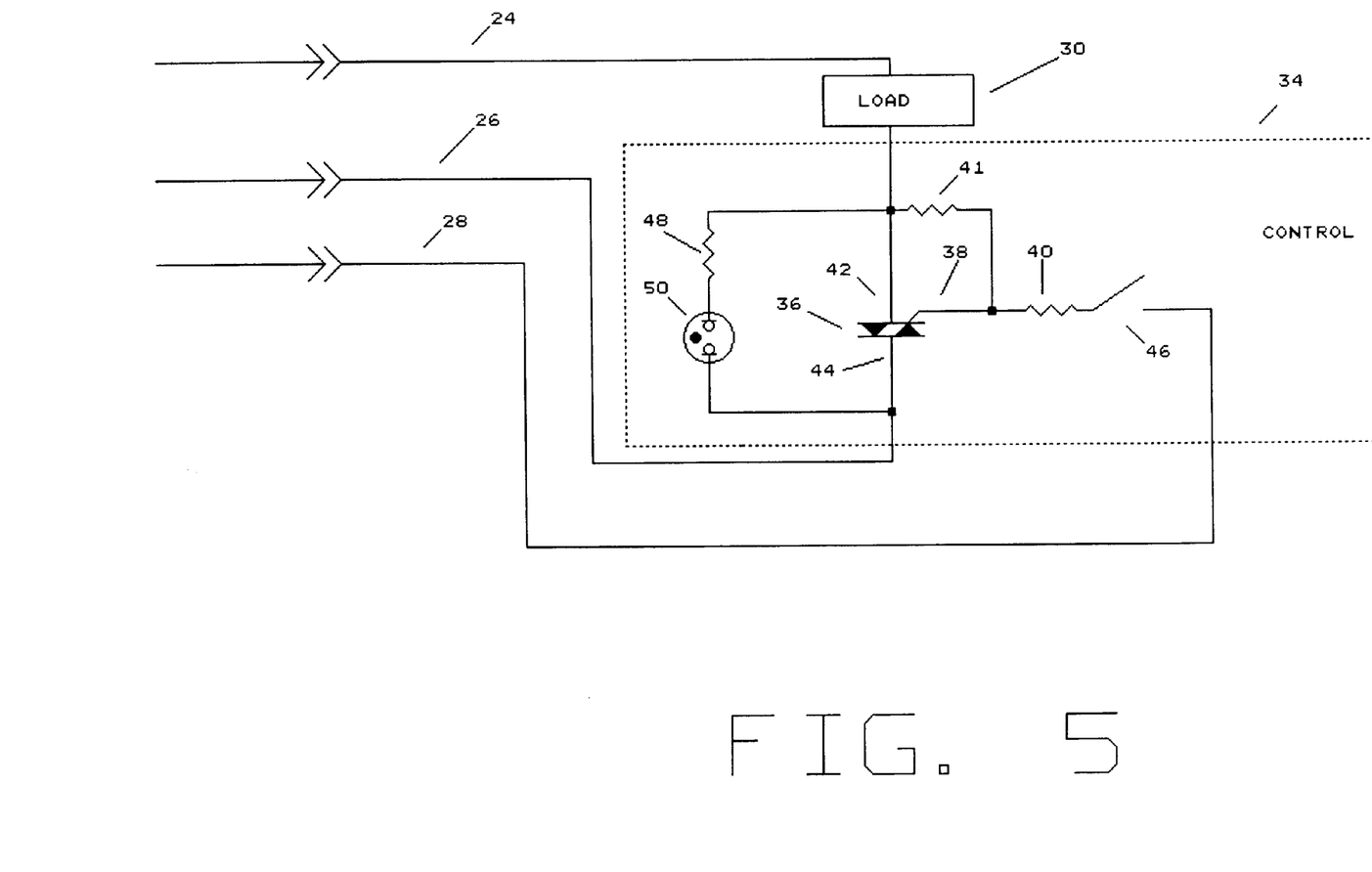
FIG. 5 SCR based ground detect circuit with low current, low voltage on/off switch FIG. 6 G round detect circuit with indicator FIG. 7 Ground detect circuit that can be used with shock prevention circuit FIG. 8 Deadzone in the AC current during which a fault can be detected FIG. 9 Alternative ground detect circuit that can be used with shock prevention circuit FIG. 10 Shock protection combined with open ground detection

FIG. 5 shows a ground detection circuit in which a low current switch 46 has been added. Even though the appliance load 30 may require many amperes of electrical current, the on/off control of the current flow may be controlled by the triac 36 by using a low current switch 46. When the low current switch 46 is in the closed position, the circuit acts as the circuit of FIG. 2, and allows power to go the load as long as a ground connection is present. If the low current switch 46 is in an open position, this serves to remove the connection of the triac gate 38 from a ground potential. The triac 36 will go to a nonconducting state and no power will be furnished to the load. Desensitizing resistor 41 serves to prevent false firings of triac 36 when the switch 46 is in an open position. It does this by effectively forcing the gate 38 voltage to be at the same potential as the MT1 terminal 42. The advantage to using the low current switch 46 is that it can be designed for relatively low currents even though it controls (through the triac 36) relatively high currents to be sourced to the load 30. In this way it can replace a more expensive high current switch that might be located in electrical series with the load.

Also shown in FIG. 5 is an indicator that can be added to the loss-of-ground detector to indicate when a loss-of-ground condition has occurred. The indicator consists of a neon indicator lamp 50 in electrical series with a limiting resistor 48 and connecting across the MT1 42 and MT2 44 terminals of the triac 36. When the triac is placed into a nonconducting state, as happens with a loss-of-ground condition, then when power is applied to the appliance, the potential difference between the hot conductor 24 and the neutral conductor 26 will appear across the resistor/neon combination, causing the neon 50 to turn on. This neon indicator lamp 50 serves to notify the user of the appliance of a loss-of-ground condition. When a ground connection is present, the triac 36 conducts, essentially "shorting out" the neon 50 and causing the neon indicator lamp 50 to be in an off condition.

Figure 6:
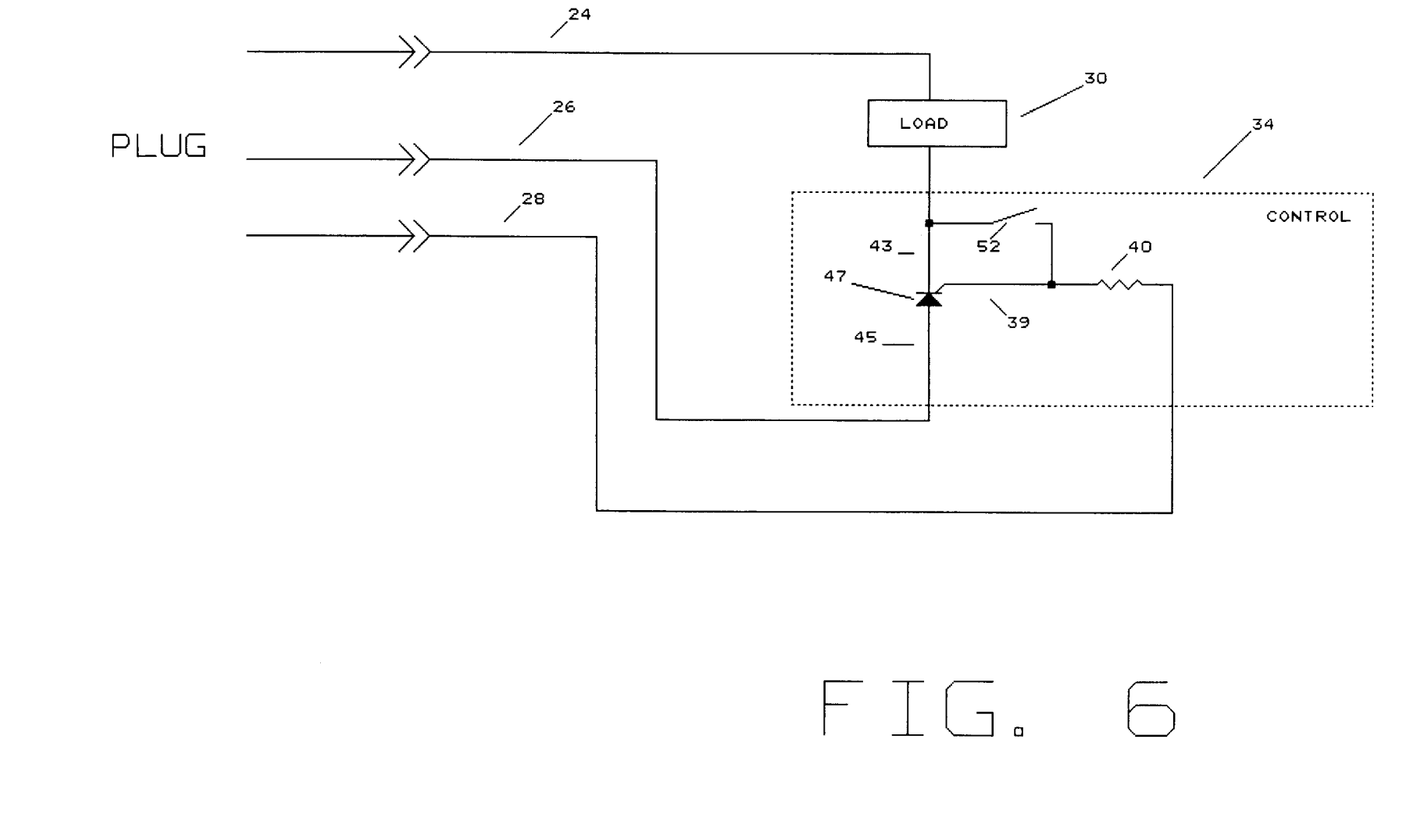

FIG. 6 shows a ground detect circuit that uses a low current/low voltage switch 52. This circuit also uses a type of thyristor called a silicon controlled rectifier or SCR 47 to demonstrate a different approach to the ground loss detection. In this embodiment, the silicon controlled rectifier 37 conducts in one direction only and always prevents electrical current flow from the cathode 43 to the anode 45. When the low current/low voltage switch 52 is in an open position, the operation of the circuit is similar to that described in conjunction with FIG. 2 except that when the system is correctly wired the load receives power only during the negative going half cycle when the ungrounded conductor 24 has a potential that is less than the grounded conductor 26. When the low current/low voltage switch 52 is in a closed position, it forces the SCR gate 39 to have the same potential as the SCR cathode 43. This forces the SCR 47 to be in a nonconducting mode. Accordingly, the role of the switch 52 is to control power to the load if a proper ground connection is present. One advantage to this configuration for power control is that the switch 52 may be a low cost switch designed for low current and low voltage operation. It is low voltage because internal to all SCR's there is a low impedance connection between the gate 39 and the cathode 43. Note that in this configuration the load 30 is on when the switch 52 is open and off when the switch 52 is closed.

Figure 7:
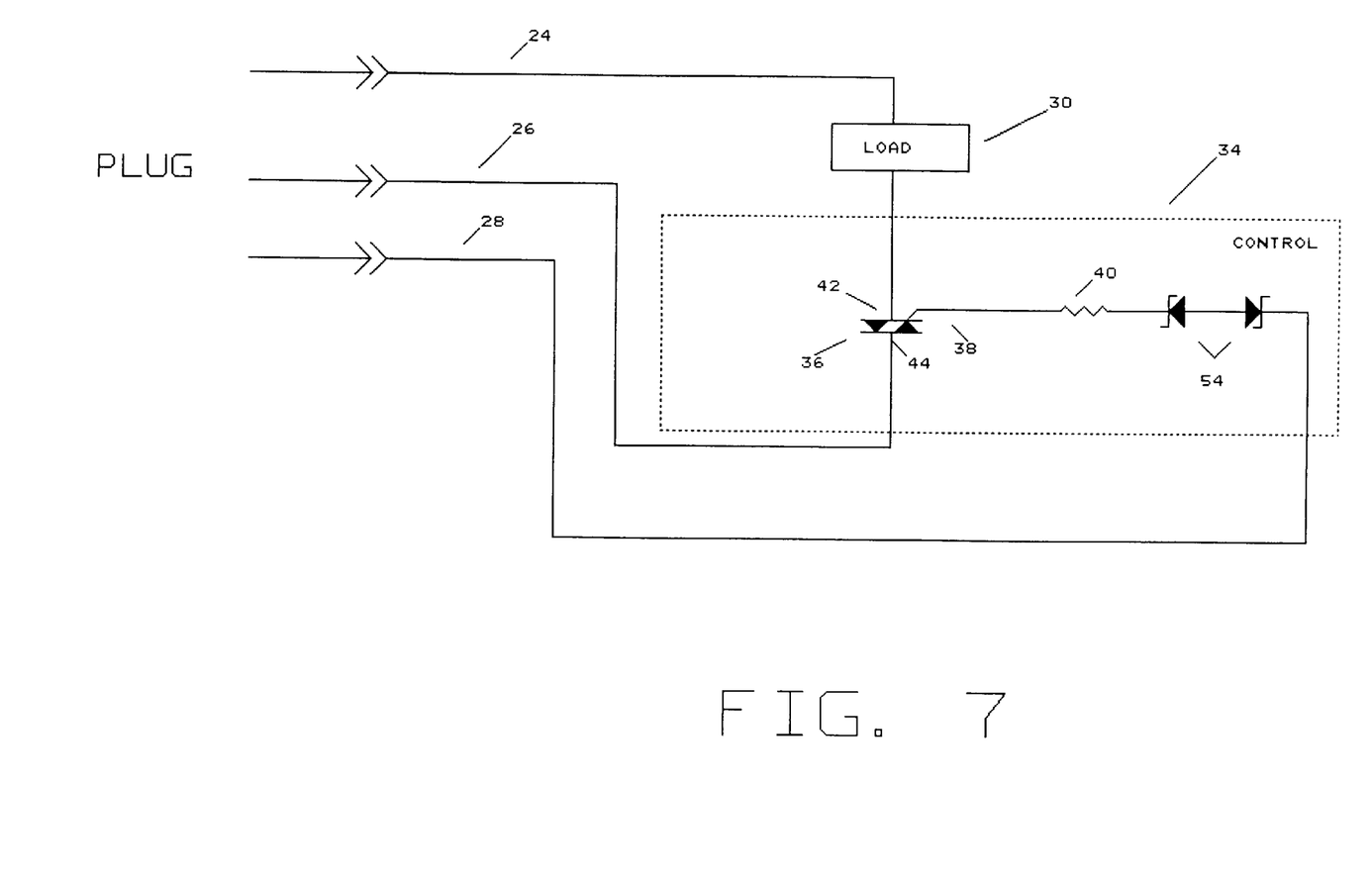

FIG. 7 depicts a loss-of-ground detection circuit that imposes a dead zone in the load current at each zero crossing. In this circuit, back to back zener diodes 54 that are in electrical series with the triac gate 38, serve to induce the dead zone. The dead zone occurs because the back to back zeners 54 will block any current flow while the voltage magnitude across the back to back zeners 54 is less than the zener voltage. Gate current is allowed to flow when the voltage magnitude exceeds the zener voltage plus a diode drop. When the gate current is allowed to flow through the back to back zener diodes 54, it triggers the triac 36, thus providing power to the load. Once the triac 36 turns on or "fires", the voltage between the triac gate terminal 38 and the ground conductor 28 will drop to less than about 2 volts thus causing the back to back zener diodes 54 to turn off and cease conducting. As in the discussion relating to FIG. 2, if a loss-of-ground condition occurs, the triac 36 will cease to be fired, thus turning off the appliance. Accordingly, the circuit in FIG. 7 gives loss-of-ground detection and can detect transposed hot and neutral conductors in addition to imposing a dead zone at zero crossings.

The circuit in FIG. 7 may be desireable because in some electrical systems, the ground conductor 28 and neutral conductor 26 may have a potential difference of a few volts. Since the back to back zener diodes 54 allow current flow only so long as their characteristic zener voltage is exceeded, after the triac 36 is fired, there is no ground current drawn through ground conductor 28 until the next half cycle. Accordingly, only brief pulses of electrical current are drawn from ground to fire the triac 36.

The FIG. 7 implementation is particularly helpful if the appliance with ground assurance is to be used in systems having a ground fault interrupt or GFCI. Such systems monitor ground currents and trip a circuit breaker if those currents exceed a threshhold level, typically 5 milliamperes. With the FIG. 7 implementation, the brief pulses that are used to fire triac 36 are not of sufficient duration or overall energy content to impact most GFCI circuits.

Figure 8:
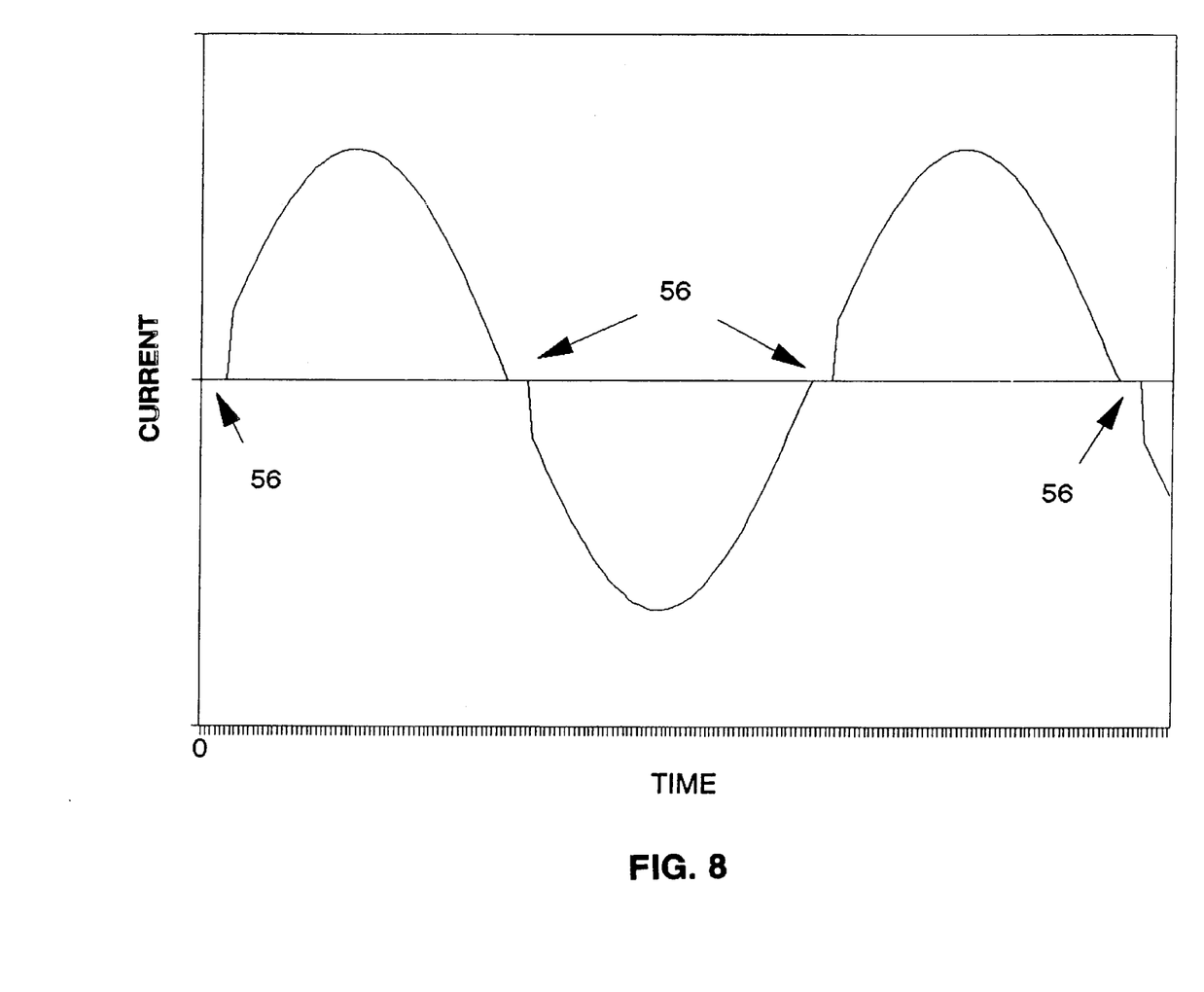

FIG. 8 depicts the current flow vs. time, through the load 30, using the circuit in FIG. 7. In FIG. 8 the load current is seen to follow an essentially sinusoidal AC profile except for a brief dead zone 56 just after each zero crossing.

Using the circuit in FIG. 7, during the times of a dead zone (when current flow through the triac 36 is essentially zero), any current flow from the hot conductor 24 will be indicative of an unintentional path around the triac 36. This unintentional path may represent a potentially dangerous situation such as a ground fault. This information can be used by a shock protection sensing circuitry in the plug to give shock protection in addition to open ground detection and transposed conductor detection. This is discussed in conjunction with FIG. 10.

Figure 9:
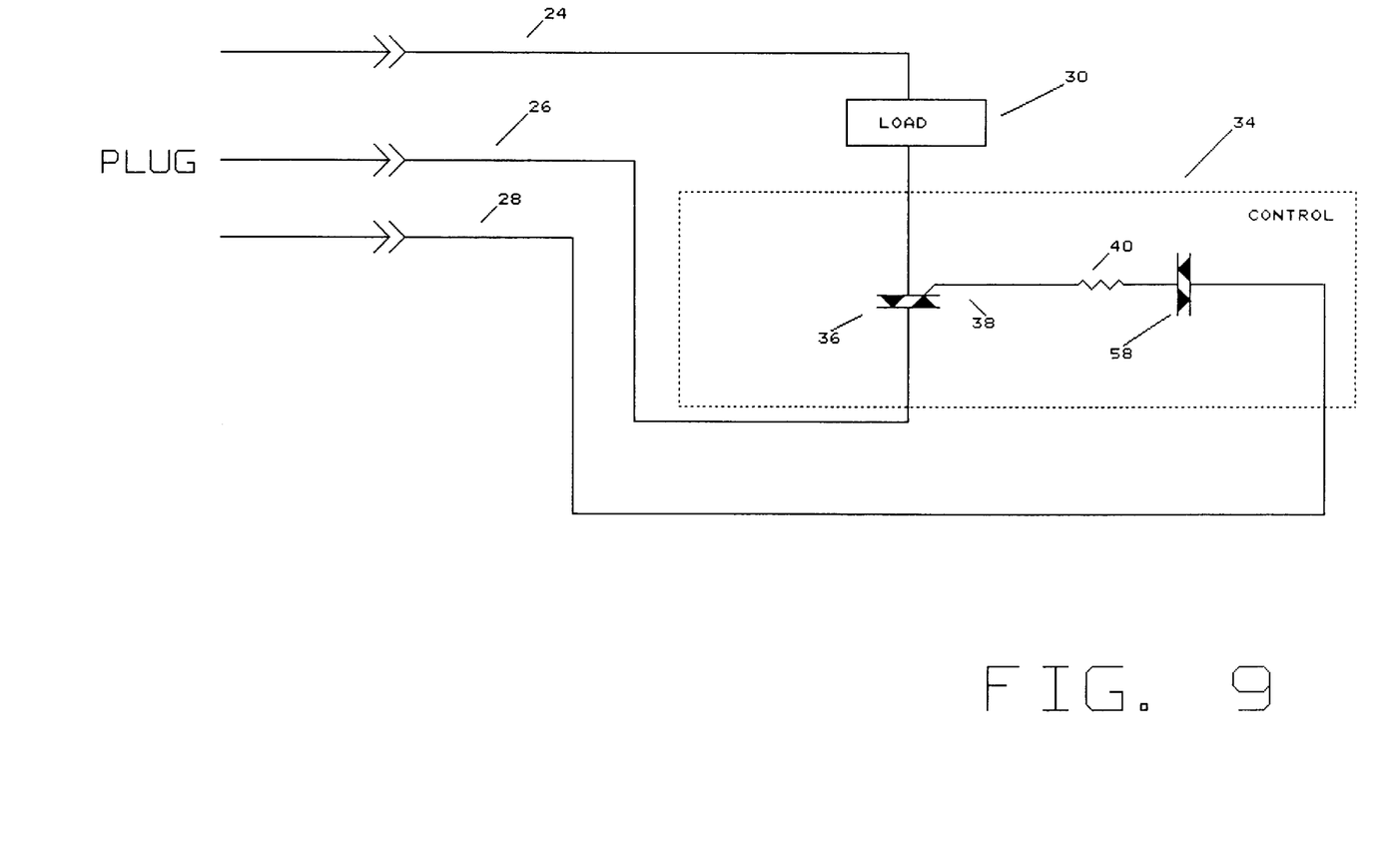

FIG. 9 depicts an alternative loss-of-ground detection circuit in which the dead zone for detecting an electrical leakage is implemented by adding a voltage triggered bilateral silicon device (diac) 58 in series with the triac gate 38. When there are low magnitude voltages across it, a diac will block current flow. When the applied voltage exceeds a characteristic voltage magnitude, in either polarity, the diac will act like a short and will allow gate current to flow between ground and triac gate 38. Once the triac "fires", the voltage between the triac gate terminal 38 and the ground conductor 28 becomes small and the diac 58 turns off. The circuits in FIG. 7 and FIG. 9 operate identically.

Figure 10:
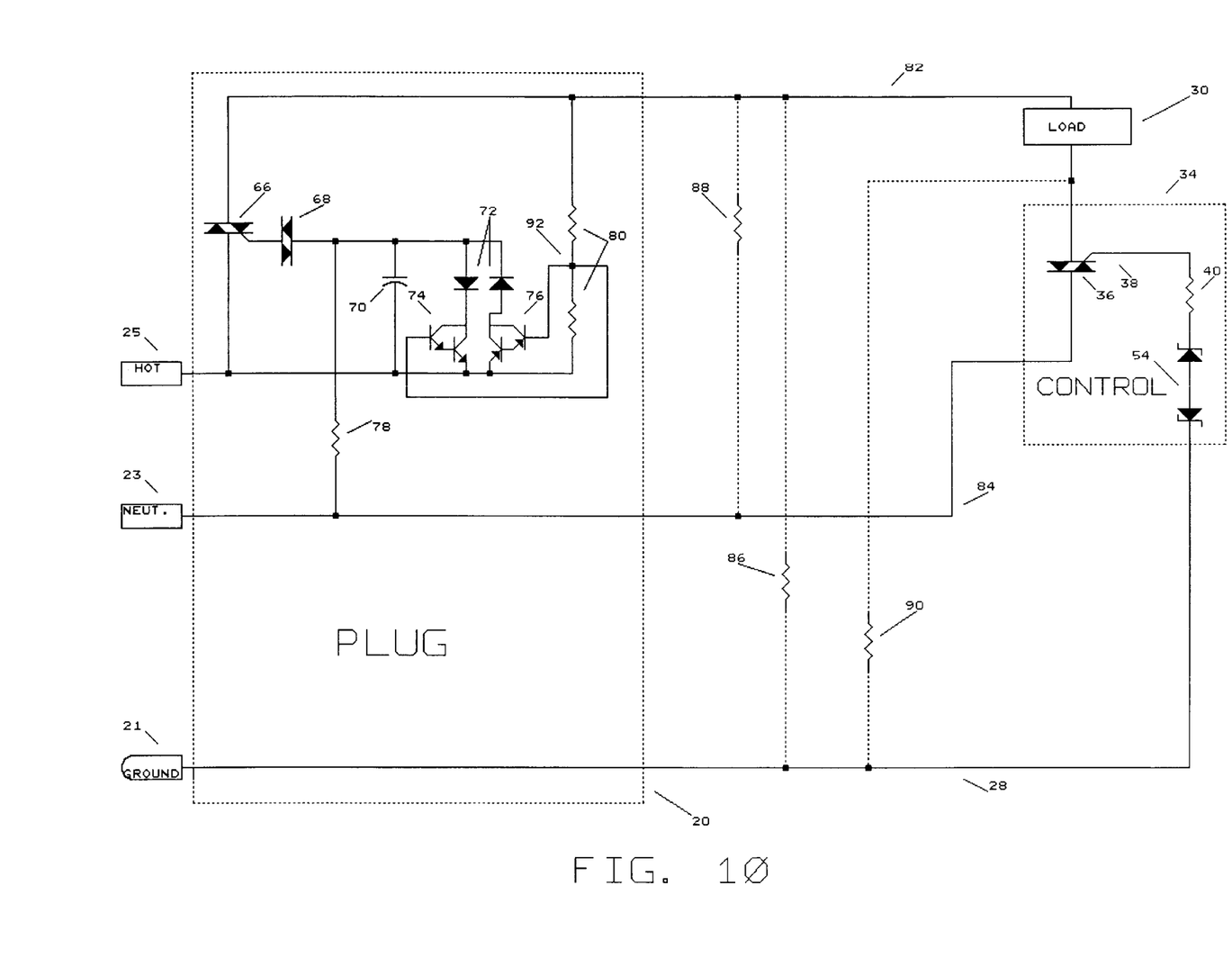

When used with the plug mounted fault interruption device depicted in FIG. 10, either of the circuits in FIG. 7 and FIG. 9 can serve as part of an electrical safety system that not only detects an open ground condition or a miswired appliance but also protects against injury due to ground faults. In FIG. 10, the hot prong 25, neutral prong 23 and ground prong 21 represent the three prongs that would be plugged into an outlet. The plug 20 has a hot side triac 66 that controls power out of the plug 20 and to the load 30. A hot to neutral fault 88, hot to ground fault 86 and load to ground fault 90 are depicted with dashed lines to indicate that these connections are not made by design, but, represent different potentially dangerous occurrences that can lead to hazardous electrical leakages (faults). In FIG. 10, any or all of these conditions can be recognized by the electronics encased within the plug 20.

In FIG. 10, on each half cycle, in the absence the faults 86, 88, or 90, the resistor 78 serves to charge capacitor 70 until a voltage in excess of the turn-on voltage for the diac 68 is obtained. At that time, the diac fires, causing the hot side triac 66 to turn on and supplying power to the load 30 through conductor 82 for the balance of that half cycle. At the beginning of each half cycle, the hot side triac 66 turns off as the current through it makes a zero crossing. This triac 66 remains in an off condition until the capacitor 70 charges sufficiently. If, however, the hot to ground fault 86 is present, then during this off time, electrical current will flow from the hot prong 60, through the voltage divider resistors 80, through the hot to ground fault 86 to ground. If the hot to ground fault 86 is sufficiently low in resistance value, the current flow will be sufficient so that the voltage at node 92 will be high enough to trigger one of the Darlington transistors 74 or 76. This will cause the Darlington transistors to conduct, thereby discharging the capacitor 70 and preventing it from firing the hot side triac 66. The result is that for the balance of the half cycle, current will be inhibited from flowing to the load. A similar analysis can be used to show that a hot to neutral fault 88 or a load to ground fault 90 would result in the hot side triac 66 being turned off.

In practice, the resistors 80 would be chosen to be of sufficiently high resistance that current flow through them would be at a very low level. Two Darlington transistors are necessary because of the symmetry of the circuit. Alternating half cycles will be positive and then negative. For positive half cycles, the Darlington PNP transistor 76 can be activated to inhibit triac 66 tun-on. For negative half cycles, the Darlington NPN transistor 74 can be activated. The steering diodes 72 serve to select the active transistor during each half cycle. The dead zone provided by the control 34 is necessary to the workings of the fault detection circuitry in the plug 20. At the beginning of every half cycle, the electronic circuit in the plug 20 is looking for a significant leakage before it turns on the triac 66. If the back to back zener diodes 54 were replaced by a resistor, there would be no dead zone in current flow through the load 30 and to the electronics in the plug 20, the load 30 would look like a fault.

Adding the ground assurance circuitry of the present invention to fault detection circuitry can enhance appliance safety. In particular, the fact that the ground assurance circuitry also can recognize transposed conductors gives a measure of safety. For example, if the hot and neutral conductors are transposed so that conductor 84 has a hot potential referenced to ground 28, then the triac 36 will not turn on. Accordingly, fault 88 will not be dangerous because the triac 36 will not conduct. Faults 86 and 90 will not be dangerous because in a transposed system they are located between neutral and ground and there is little voltage between neutral and ground potentials.

It should be recognized that although the above discussion has been directed at having ground detection circuitry in an appliance and optionally, ground fault protection at the plug, the technology can be applied to any combination of source and load within an electrical distribution system. For example, the ground detection circuitry could be at an electrical outlet, in which case, the outlet and whatever was plugged into it would serve as the load. The fault detection/interruption portion of the system could be located at a remotely located distribution panel. One of the key advantages of the present invention is that it uses conventional wiring schemes without the need for adding additional wiring, either between plug and appliance load, or between an arbitrary source location and load location.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The teachings of all applications, articles, patents and other references mentioned above are herein incorporated by reference.

What is claimed is:

1. An apparatus connected in electrical series with an electrical appliance load of an electrical appliance, said apparatus comprising a thyristor whose gate is controlled by a potential state of a ground conductor, said thyristor allowing flow of electrical current in the electrical appliance load if said potential state is at a substantially zero voltage with respect to ground potential and preventing flow of electrical current in the electrical appliance load if said potential state is not at a substantially zero voltage with respect to ground potential, thereby serving to turn off power in the electrical appliance upon occurrence of a loss of ground condition.

2. The apparatus of claim 1 wherein an electronic amplifier connects between said gate of said thyristor and the ground conductor, thereby minimizing electrical current flowing through the ground conductor.

3. The apparatus of claim 1 wherein one or more zener diodes connect between said gate of said thyristor and the ground conductor, thereby minimizing time periods during which electrical current flows to ground.

4. The apparatus of claim 1 wherein said apparatus additionally serves to turn off power in the electrical appliance upon transposition of incoming power conductors.

5. A method for controlling power in an electrical appliance, the method comprising the steps of providing a thyristor in electrical series with the electrical appliance, controlling a gate of the thyristor by a potential state of a ground conductor, allowing electrical current to flow if the potential state is at a substantially zero voltage with respect to ground potential, and preventing flow of electrical current if the potential state is not at a substantially zero voltage with respect to ground potential.

6. The method of claim 5 additionally comprising the step of minimizing electrical current flowing through the ground conductor to ground via an electronic amplifier connected between the gate of the thyristor and the ground conductor.

7. The method of claim 5 additionally comprising the step of minimizing time periods during which electrical current flows through ground via one or more zener diodes connected between the gate bf the thyristor and the ground conductor.

8. The method of claim 5 additionally comprising the step of preventing flow of electrical current upon transposition of incoming power conductors.

* * * * *